(12) United States Patent
Lefevere et al.

(10) Patent No.: US 7,864,985 B1
(45) Date of Patent: Jan. 4, 2011

(54) AUTOMATIC OPERATOR-INDUCED ARTIFACT DETECTION IN DOCUMENT IMAGES

(75) Inventors: Francois-Marie Lefevere, Mountain View, CA (US); Guillaume Raphael Poncin, Stanford, CA (US); Siraj Khaliq, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/611,311

(22) Filed: Nov. 3, 2009

Related U.S. Application Data

(63) Continuation of application No. 10/938,505, filed on Sep. 13, 2004, now Pat. No. 7,634,112.

(51) Int. Cl.
*G06K 9/00* (2006.01)
(52) U.S. Cl. ........................ 382/112; 358/462
(58) Field of Classification Search ................. 382/100, 382/103, 112, 173, 174, 176, 181, 190, 195, 382/275, 274, 321; 358/448, 461, 452, 462, 358/500, 520
See application file for complete search history.

(56) References Cited

U.S. PATENT DOCUMENTS

| | | | | |
|---|---|---|---|---|
| 5,377,019 A | * | 12/1994 | Okisu et al. | 358/464 |
| 5,677,776 A | | 10/1997 | Matsuda et al. | |
| 5,808,756 A | | 9/1998 | Matsuda | |
| 6,011,635 A | * | 1/2000 | Bungo et al. | 358/488 |
| 6,256,411 B1 | * | 7/2001 | Iida | 382/203 |
| 6,594,401 B1 | * | 7/2003 | Metcalfe et al. | 382/275 |
| 6,741,741 B2 | * | 5/2004 | Farrell | 382/199 |

OTHER PUBLICATIONS

Francois-Marie Lefevere et al., co-pending U.S. Appl. No. 10/938,505, filed Sep. 13, 2004, entitled "Automatic Finger Detection in Document Images".

* cited by examiner

*Primary Examiner*—Anand Bhatnagar
(74) *Attorney, Agent, or Firm*—Harrity & Harrity, LLP (57) ABSTRACT

Techniques for scanning a document, such as a book, magazine, or catalog, are described in which artifacts (e.g., a hand or other body part) in the scanned image are automatically detected. When the artifact is determined to be in a critical portion of the image, a signal may be issued to re-scan the image.

21 Claims, 11 Drawing Sheets

AUTOMATIC OPERATOR-INDUCED ARTIFACT DETECTION IN DOCUMENT IMAGES

RELATED APPLICATION

This application is a continuation of U.S. application Ser. No. 10/938,505, filed Sep. 13, 2004, the entire contents of which is incorporated herein by reference.

BACKGROUND

A. Field of the Invention

Systems and methods described herein relate to image scanning and, more particularly, to techniques for scanning and locating features in documents.

B. Description of Related Art

Modern computer networks, and in particular, the Internet, have made large bodies of information widely and easily available. Free Internet search engines, for instance, index many millions of web documents that are linked to the Internet. A user connected to the Internet can enter a simple search query to quickly locate web documents relevant to the search query.

One category of content that is not widely available on the Internet, however, are the more traditional printed works of authorship, such as books and magazines. One impediment to making such works digitally available is that it can be difficult to convert printed versions of the works to digital form. Optical character recognition (OCR), which is the act of using an optical scanning device to generate images of text that are then converted to characters in a computer readable format (e.g., an ASCII file), is a known technique for converting printed text to a useful digital form. OCR systems generally include an optical scanner for generating images of printed pages and software for analyzing the images.

When scanning printed documents, such as books, that are permanently bound, the spine of the document can cause a number of scanning problems. For example, although it is generally desirable to generate the images of the printed pages from flat, two-dimensional, versions of the pages, the spine of the book may cause the page to have a more three-dimensional profile. Additionally, scanning each page may require a human operator to manually turn the pages of the book. Occasionally, the human operator may introduce errors into the scanned image, such as by placing a hand, or portion of a hand, over the scanned image of the page. Text occluded by a hand cannot be further processed using OCR techniques.

SUMMARY OF THE INVENTION

According to one aspect, a method includes locating a body part in an image of a page of a document, determining whether the located body part is in a critical portion of the image, and issuing a signal to re-scan the page when the located body part is determined to be in a critical portion of the image.

According to another aspect, a method includes locating a portion of an artifact in an image as an area in the image that corresponds to an estimate of hue and saturation values associated with the artifact; expanding outward the located area corresponding to the artifact; and generating an indication of the artifact based on the expanded area.

Yet another aspect is directed to a system that includes a camera to generate an image of a page of a document and control logic. The control logic locates a body part in an image of the page, determines whether the located body part is in a critical portion of the image, and issues a signal to re-scan the page when the located body part is determined to be in a critical portion of the image.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

Overview

Figure 1:
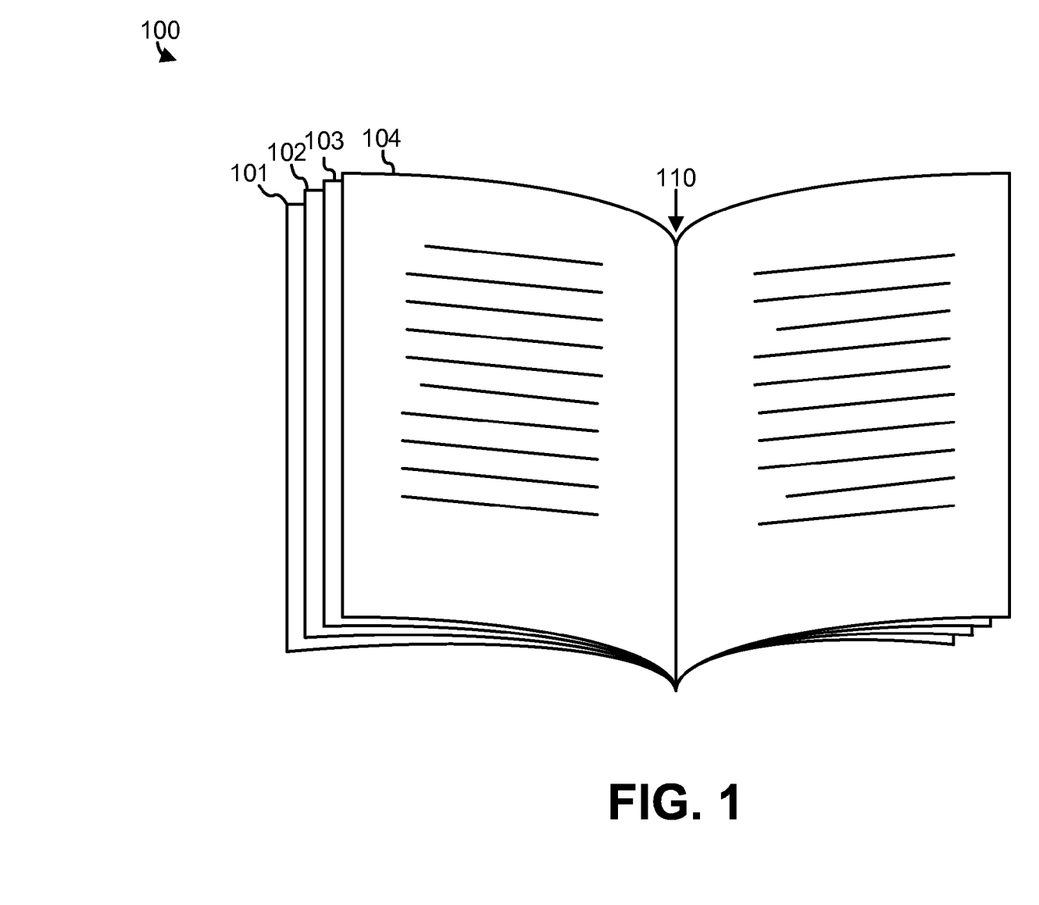
FIG. 1 is a diagram illustrating a book that is to be scanned.

FIG. 1 is a diagram illustrating a book 100 that is to be scanned. Pages 101-104 of book 100 emanate from a central groove 110 that is defined by the spine of the book. Page 104 is shown as the opened-to left page of the book. It may be desirable to perform image processing functions, such as OCR functions, on the scanned images of book 100. Peak OCR performance can be achieved when the scanned images are distortion free and do not contain external artifacts, such as a hand or other body part over a critical portion (e.g., a text portion) of the image.

Figure 2:
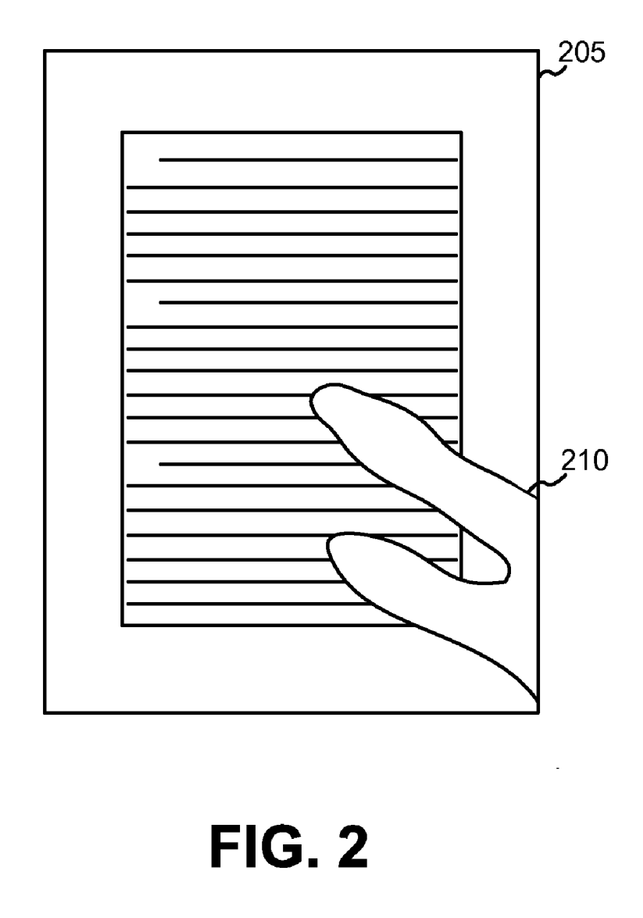
FIG. 2 is a diagram illustrating a two-dimensional view of a scanned page of the book shown in FIG. 1.

FIG. 2 is a diagram illustrating a two-dimensional view of a scanned page 205 of book 100. The scanned image includes a portion of a hand 210 of the operator. The operator, when turning the page of the book, may have inadvertently not removed his/her hand from the image before the scanning began.

Consistent with aspects of the invention, a hand or other body part may be automatically detected in page 205. The operator may be informed of the scanning error and given a chance to re-scan the page.

System Overview

Figure 3:
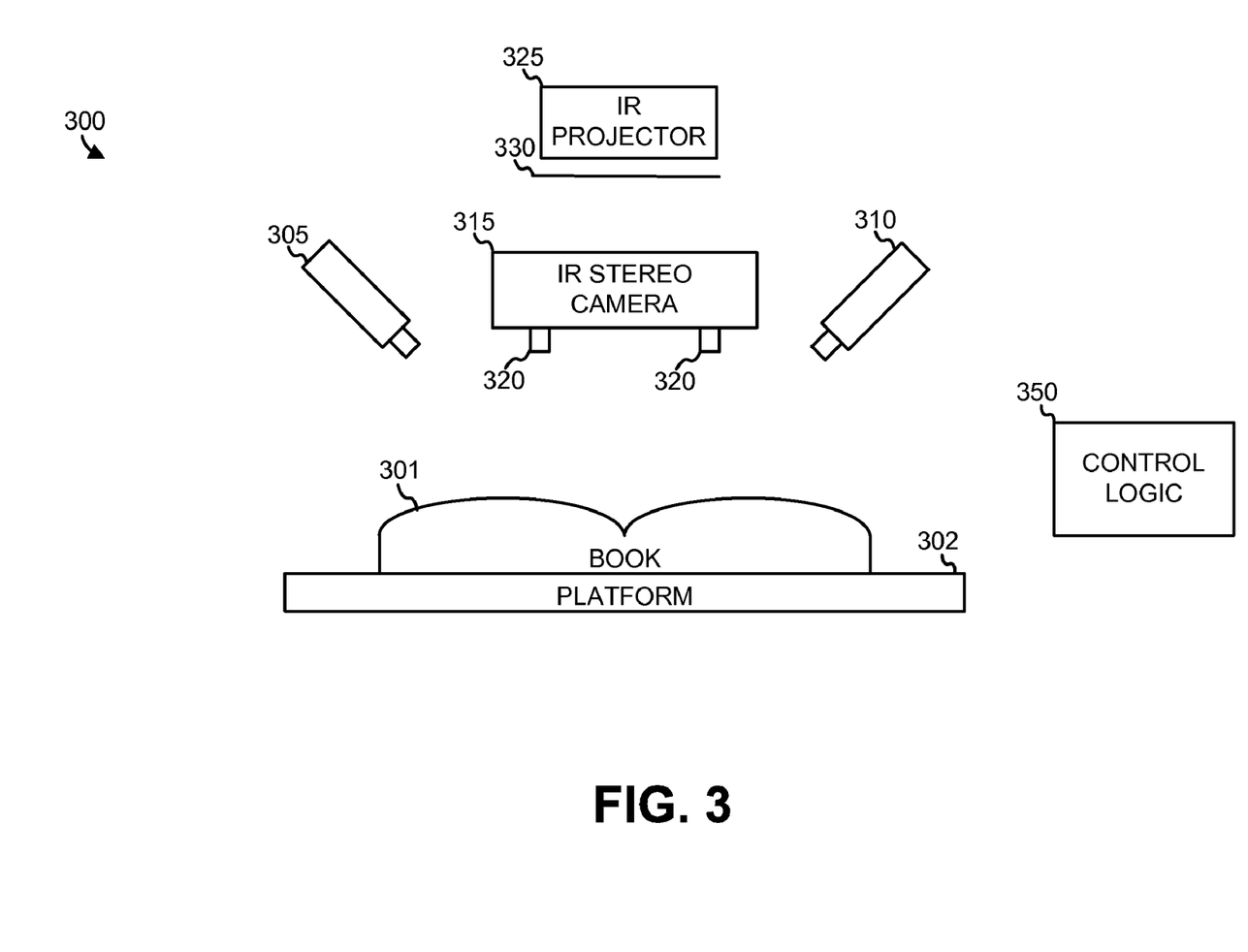
FIG. 3 is a diagram illustrating an exemplary system for optically scanning documents, such as books, magazines, or catalogs to obtain images of the documents.

FIG. 3 is a diagram illustrating an exemplary system 300 for optically scanning documents, such as books, magazines, catalogs, newspapers, or posters to obtain images of the documents. System 300 may include cameras 305 and 310 for taking two-dimensional images of a book 301 resting on a platform 302. Documents other than books, such as, for example, magazines or other documents for which it is difficult to generate a flat image of a page, may also be processed. An infra-red (IR) stereo camera 315 may include multiple imaging lenses 320. An IR projector 325 may project IR radiation through a pattern mask 330 onto book 301. Control logic 350 may control the operation of system 300. For example, control logic 350 may control cameras 305, 310, and 315, and receive and process images taken by these cameras.

Cameras 305 and 310 may include high definition cameras. In some implementations, only one of cameras 305 and 310 may be used. In other implementations, additional cameras similar to cameras 305 and 310 may be used.

IR stereo camera 315, by virtue of its multiple imaging lenses 320, can take multiple images of book 301, each from different viewpoints. The images may be set to be taken in the IR spectrum. IR projector 325 may project IR radiation through pattern mask 330 onto book 301. Thus, IR stereo camera 315 may take a stereoscopic image of the pattern defined by pattern mask 330. The pattern may then be detected in the resulting image. The images can be stereoscopically combined (by, for example, control logic 350), using known stereoscopic techniques, to obtain a three-dimensional mapping of the pattern.

Figure 4:
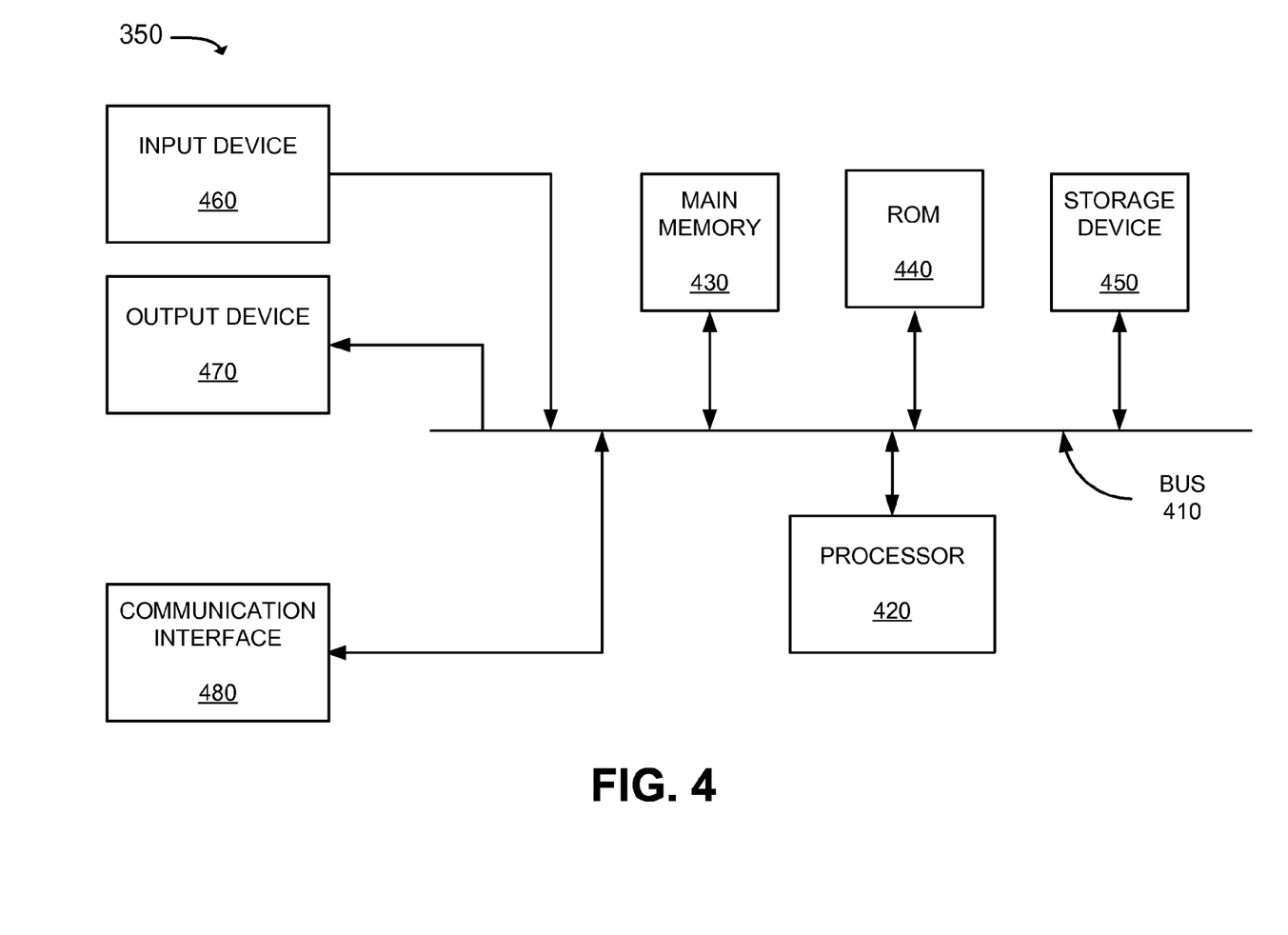
FIG. 4 is a diagram illustrating an exemplary implementation of the control logic shown in FIG. 3.

FIG. 4 is a diagram illustrating an exemplary implementation of control logic 350. Control logic 350 may include a bus 410, a processor 420, a main memory 430, a read only memory (ROM) 440, a storage device 450, an input device 460, an output device 470, and a communication interface 480. Bus 410 may include a path that permits communication among the components of control logic 350.

Processor 420 may include a conventional processor, microprocessor, or processing logic that interprets and executes instructions. Main memory 430 may include a random access memory (RAM) or another type of dynamic storage device that stores information and instructions for execution by processor 420. ROM 440 may include a conventional ROM device or another type of static storage device that stores static information and instructions for use by processor 420. Storage device 450 may include a magnetic and/or optical recording medium and its corresponding drive.

Input device 460 may include a conventional mechanism that permits an operator to input information to control logic 350, such as a keyboard, a mouse, a pen, voice recognition and/or a biometric mechanism, etc. Output device 470 may include a conventional mechanism that outputs information to the operator, including a display, a printer, a speaker, etc. Communication interface 480 may include any transceiver-like mechanism that enables control logic 350 to communicate with other devices and/or systems.

Body Part Detection

Figure 5:
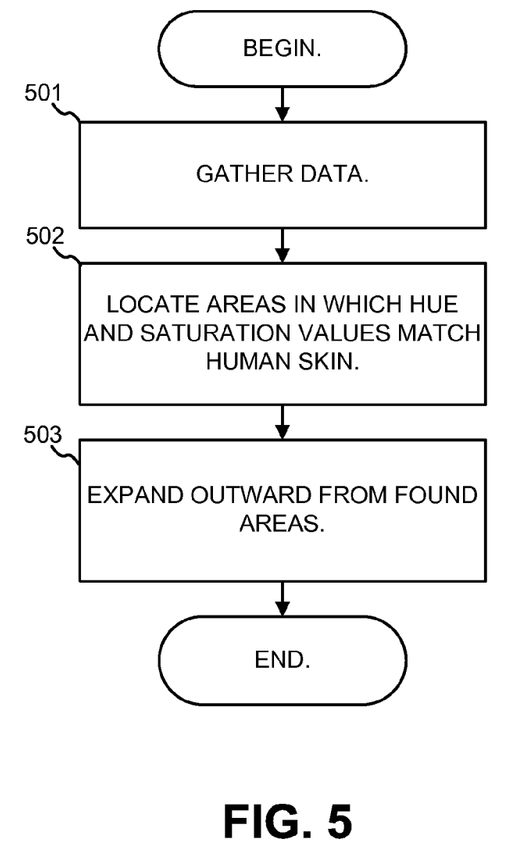
FIG. 5 is a flowchart illustrating exemplary operations of the system shown in FIG. 3 in processing a page of a document to detect a body part.

FIG. 5 is a flowchart illustrating exemplary operations of system 300 in processing a page of a document to detect a body part, such as a hand, that is inadvertently included in one or more of the two-dimensional images taken by cameras 305 and 310. Although the "body part" will henceforth be discussed as the operator's hand (or portion of a hand), the concepts discussed herein could similarly be applied to other operator body parts, such as arms, wrists, etc.

System 300 may begin by gathering data (act 501). The gathered data may include the high definition two-dimensional images taken by one or both of cameras 310 and 305, and optionally, may include the stereo images taken by IR stereo camera 315. The data gathered in act 501 may be saved to a computer-readable medium, and in the case of the stereo images, may be processed to match pattern 350 in at least two of the stereo images in order to recover the three-dimensional position of each point (pixel) in the image.

The two dimensional images taken by cameras 305 and 310 may be color images in which each pixel of the image is encoded as a red, green, blue (RGB) pixel model or as a hue, saturation, value (HSV) pixel model. Both the RGB and HSV color models are known in the art. In general, RGB is a color model based on the relative portions of the red, green, and blue primary colors that can be combined to form any other color. The HSV color model is an additive color system based on the attributes of color (hue), percentage of white (saturation), and value (brightness or intensity). In other words, in HSV, the hue represents the color such as red or blue, the saturation represents how strong the color is, and the value represents the brightness. RGB values can be converted to HSV values, and vice-versa, using well known conversion formulas. Although the HSV color model is primarily used in the acts described below, similar techniques could be applied to other color models, such as the hue, lightness and saturation (HLS) color model.

The hue and saturation values for the pixels in the two-dimensional image may next be examined to locate areas within the image in which the pixels are within a certain hue and saturation range (act 502). This hue and saturation range may be selected to be a conservative range that corresponds, with a high probability, to human skin.

Figure 6:
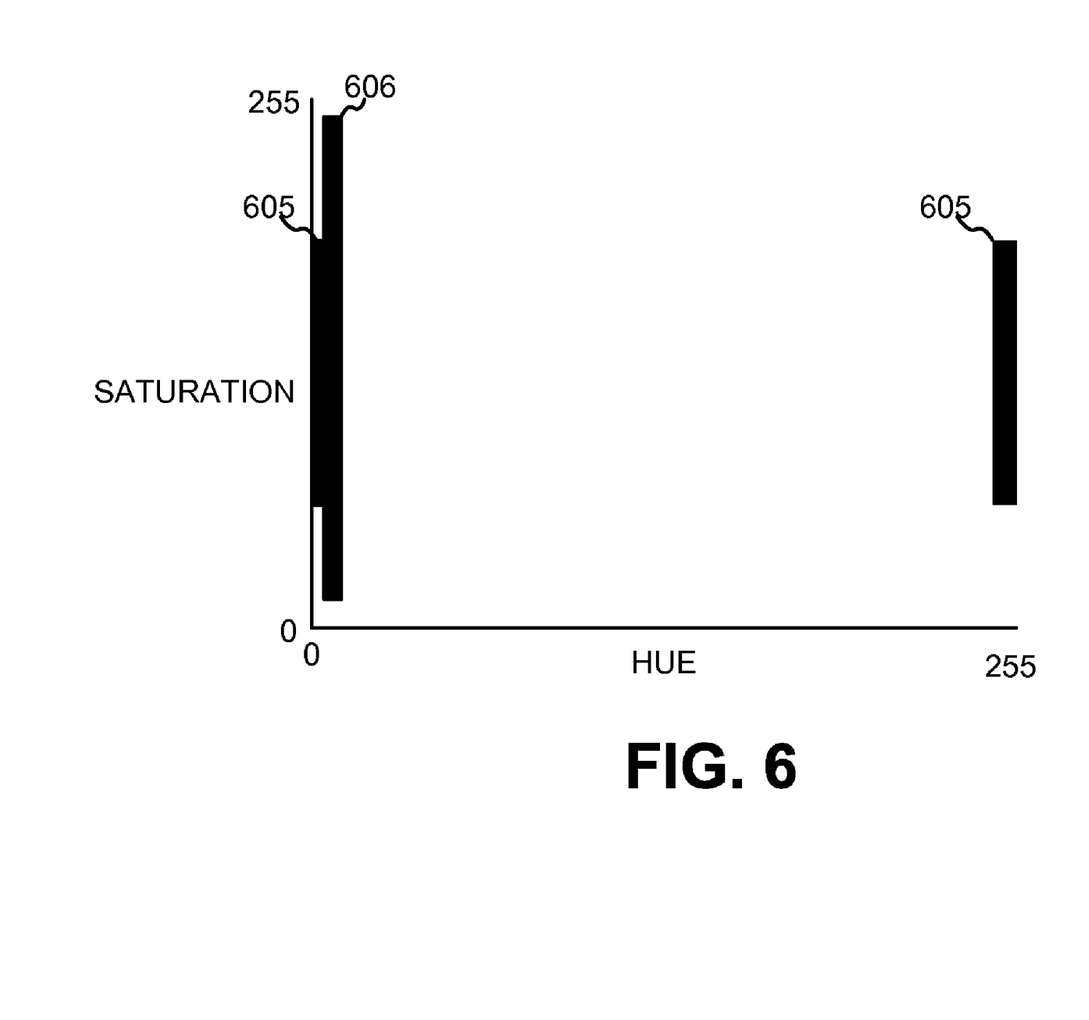
FIG. 6 is a diagram illustrating exemplary hue and saturation ranges that may be used to define human skin.

FIG. 6 is a diagram illustrating hue and saturation ranges that may be used to define human skin. The human skin values are shown in FIG. 6 as areas 605 and 606. In one implementation, area 605 may generally be defined as, for example, a rectangle having hue values between approximately 250 and three, and saturation values between approximately 60 and 180. In this implementation, both the hue and saturation values are defined on a scale from 0 to 255 and the scale for hue is a circular one. That is, a hue value of zero is the same as a hue value of 256. Area 606 may include the rectangular region having hue values between approximately four and 17 and saturation values between approximately 17 and 250. Other values defining areas 605 and 606 may also be used. For example, if the operators wear gloves, another region may be used to correspond to the gloves. In general, appropriate values can be determined by inspection from hue and saturation values sampled from multiple people. In one implementation, the hue and saturation range defining area 605 may be specifically tuned to the operator or operators that are using system 300.

Figure 7A:
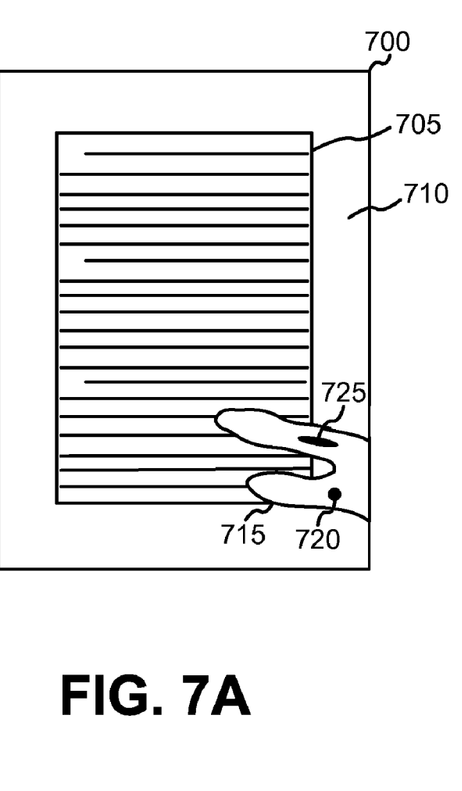
FIGS. 7A and 7B are diagrams of exemplary scanned images of pages that include images of a hand of an operator.
Figure 7B:
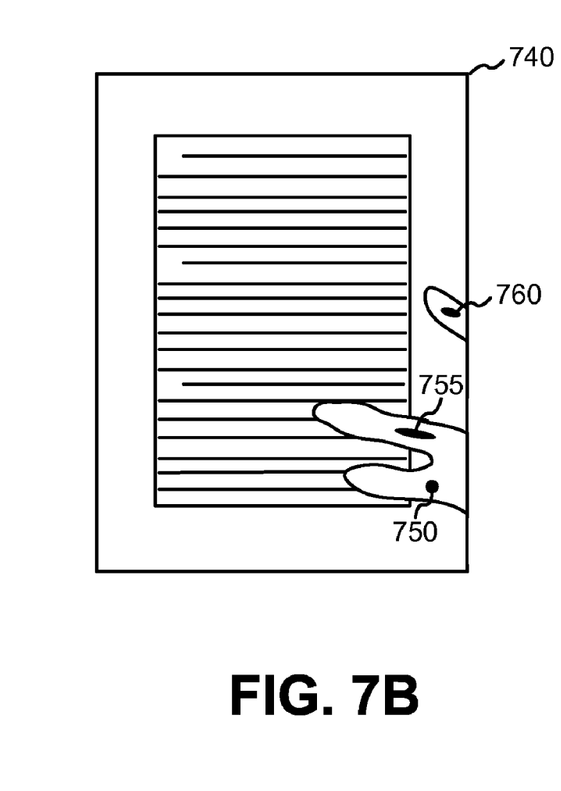

FIG. 7A is a diagram of a scanned image of a page 700. Page 700 includes a text area 705, a white space area 710, and an image of a hand 715. The image of hand 715 may include a number of areas, labeled as areas 720 and 725, that may have been identified as pixel areas meeting the hue and saturation requirements of act 502. FIG. 7B is a diagram of scanned image of a page 740, similar to page 700, illustrating a second example of a hand occluding text on a page 740. Three areas, labeled as areas 750, 755, and 760 may have been identified as pixel areas meeting the hue and saturation requirement of act 502.

Figure 8A:
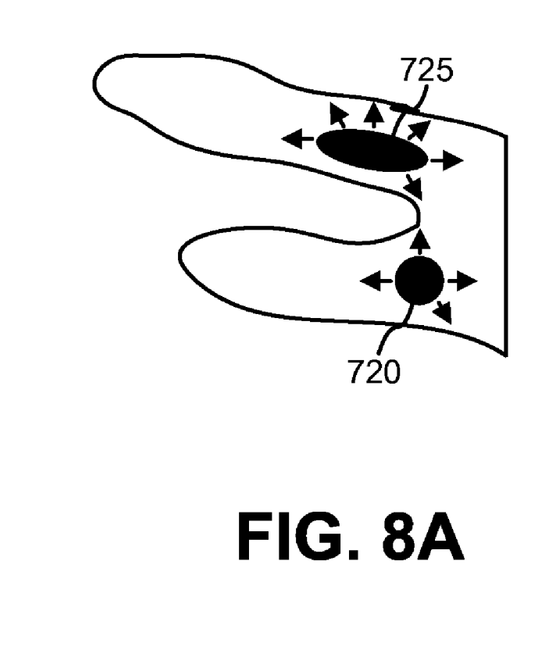
FIGS. 8A and 8B are diagrams illustrating expansion of initially located areas.
Figure 8B:
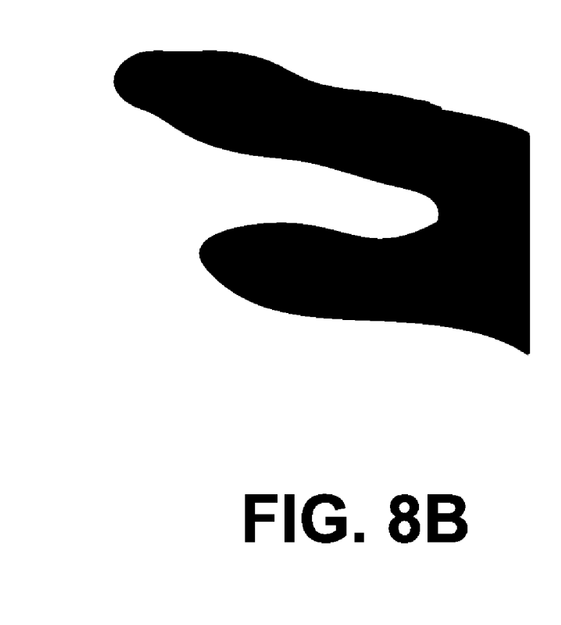

As mentioned, the areas located in act 502 may generally be defined by a relatively conservative range for the hue and saturation values. These conservative areas may then be expanded outward to include additional areas around those areas found in act 502 (act 503). This concept is illustrated in FIGS. 8A and 8B, in which areas 720 and 725 (FIG. 7A) are expanded to include all of the image of hand 715.

A number of known techniques could be used to expand the conservative estimate of the operator's skin as performed in act 503. For example, hue and saturation values surrounding a currently identified area can be examined and a determination made as to whether the values are close enough to their neighboring "good" values to be included in the newly expanded area. This principle for expanding an area is based on the premise that the hue and saturation values will gradually change while the image still corresponds to the hand. Additionally, edge detection techniques may be used to detect edges in the image that may indicate a change from an image area corresponding to a hand or a non-hand area.

Page Section Detection

Figure 9:
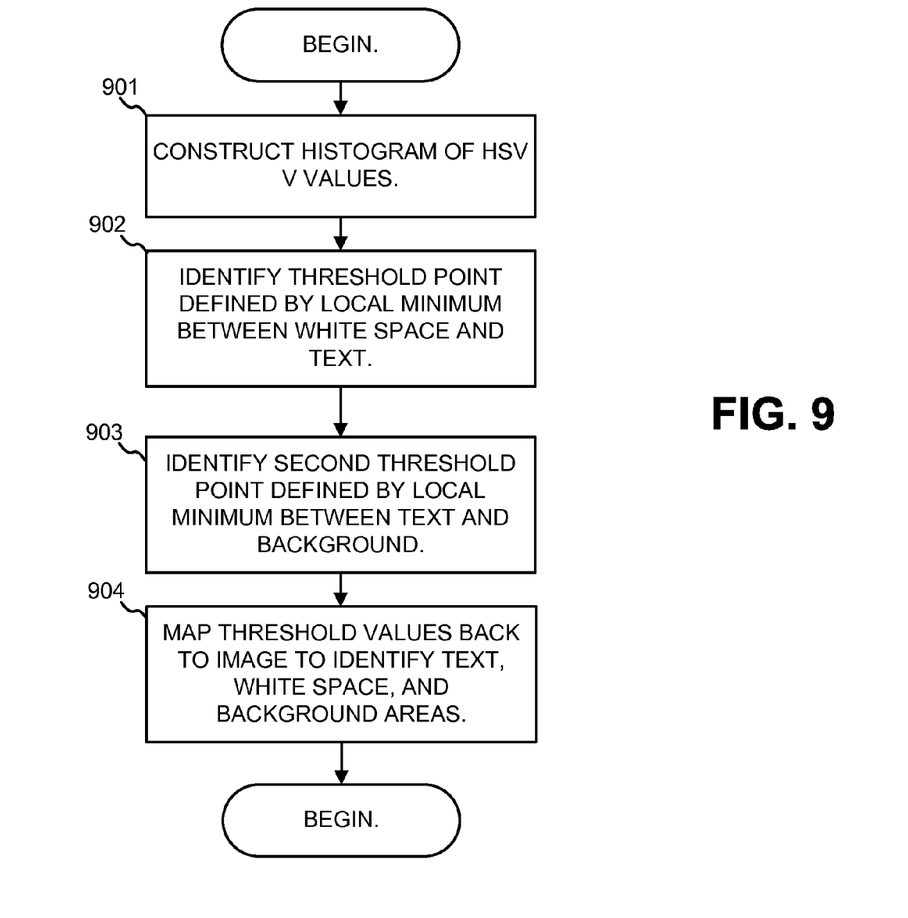
FIG. 9 is a flowchart illustrating exemplary operations for identifying segments in a two-dimensional image of a document.

In addition to detecting hands (or other body parts) in the two-dimensional image, control logic 350 may detect boundaries in the image corresponding to text segments and non-text segments, such as white space (e.g., empty margins) surrounding the text segments. FIG. 9 is a flowchart illustrating exemplary operations for identifying segments in a two-dimensional image of a document.

Figure 10:
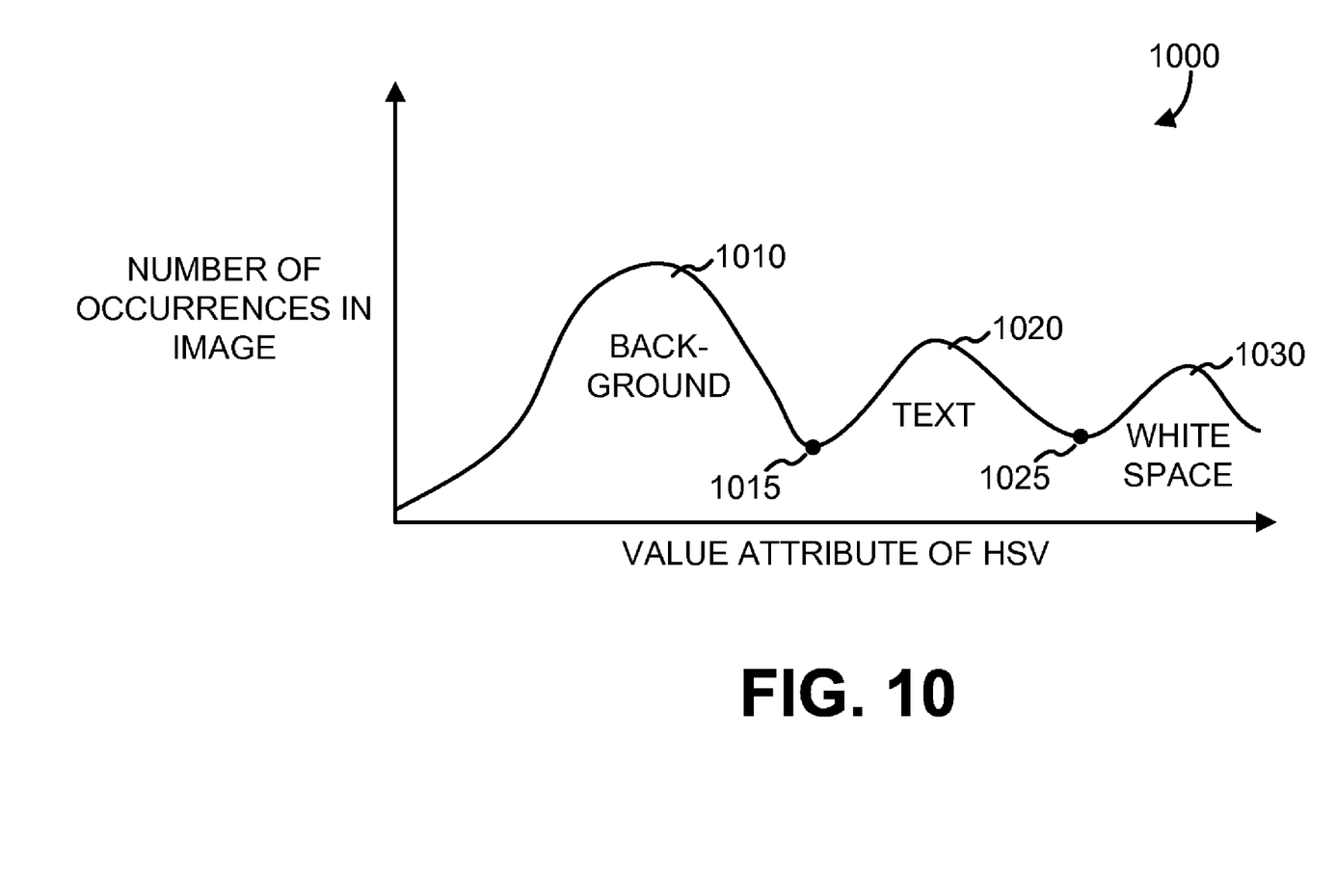
FIG. 10 is a diagram illustrating an exemplary histogram constructed for the Value attributes of an image.

In one implementation, different segments are identified based on the Value attribute in the HSV model. A histogram may be constructed for the Value attributes of an image (act 901). FIG. 10 is a diagram of an exemplary histogram 1000 constructed for the Value attributes of an image. In general, for a typical page of a document, histogram 1000 may include a number of distinct local portions 1010, 1020, and 1030, that may correspond to background, text, and white space sections of the document, respectively. These portions are generally defined by local maxima in the histogram. In the document page shown in FIG. 7A, for example, text area 705 may generally correspond to portion 1020 of the histogram and white space area 710 may generally correspond to portion 1030 of the histogram. Portion 1010 of the histogram may correspond to background in the image, such as platform 302 (not shown in FIG. 7A).

Histogram 1000 may be examined to identify a threshold point 1025 that can be used to separate text portion 1020 from white space portion 1030 (act 902). Threshold point 1025 may be determined by, for example, locating a local minimum between text portion 1020 and white space portion 1030. Histogram 1000 may similarly be examined to identify a second threshold point 1015 that can be used to separate text portion 1020 from background portion 1010 (act 903). Threshold point 1015 may be determined by, for example, locating a local minimum between text portion 1020 and background portion 1010.

Threshold points 1015 and 1025 generally define the various portions 1010, 1020, and 1030 of histogram 1000. Threshold points 1015 and 1025 may be used to map the values in histogram 1000 to the corresponding portions of the image, (act 904), and thus to identify the portions of the image. For example, referring to the document image shown in FIG. 7A, text area 705 may be identified from portion 1020 of histogram 1000 and white space area 710 may be identified from portion 1030 of histogram 1000. Background area outside of document 700 may be identified from portion 1010 of histogram 1000.

Other image processing techniques may be used to enhance or simplify the identification of text area 705, white space area 710, and the background area. For example, the image may be converted into a binary image with the white space pixels being white and the background and text pixels being black. Morphological operators can be applied to simplify these regions and the Hough transform may be applied to extract edges, with the goal that each region can be defined by its boundary in the form of a simple polygon. This can help to improve the identification of each region.

Exemplary System Operation

Figure 11:
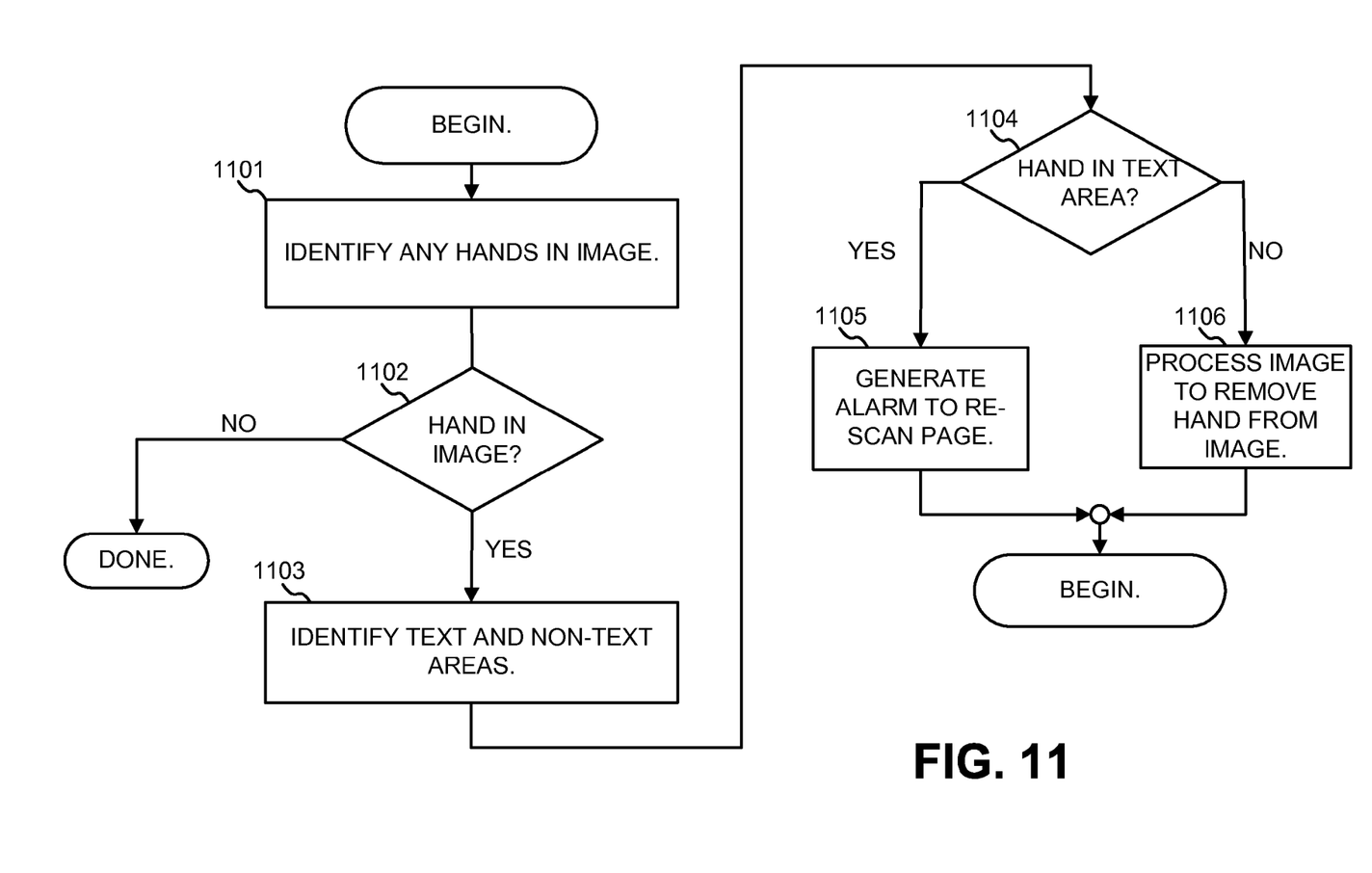
FIG. 11 is a flowchart illustrating one exemplary application of the concepts relating to detecting body parts and page sections in scanned images.

FIG. 11 is a flowchart illustrating one exemplary application of the concepts described above relating to detecting body parts and page sections in scanned images. Body parts, such as a hand or portion of a hand, may be detected in the image (act 1101). Hands may be detected as previously described with reference to FIGS. 5-8. If a hand is found in the image, the image may be further analyzed to identify text and non-text areas in the image (acts 1102 and 1103). More particularly, as previously described with reference to FIGS. 9 and 10, the image may be processed to recognize text areas (e.g., area 705), white space areas (e.g., area 710), and background areas.

If a hand is present in a text area, the covered text can probably not be converted via OCR to a character representation of the text. Accordingly, in this situation, the scanning system, such as system 300, may generate an alarm signal (e.g., audible or visual) to inform the operator that the page should be re-scanned (acts 1104 and 1105). In other words, if a hand is determined to be in the image and is in a portion of the image important for later processing of the image (e.g., OCR), the alarm signal is generated. If there is no hand in the text area, but a hand is still in the image (i.e., the hand is in a non-critical portion of the image), such as finger that covers a portion of a white space area but does not cover any text, the image may be processed to remove the hand without requiring that the image be re-scanned (acts 1104 and 1106). For example, the "white" area surrounding the hand may be extended to include the area occupied by the hand. The generated alarm signal can take many different forms, such as an audible or visual signal or as the cessation of a normally-on "all ok" signal.

One of ordinary skill in the art will recognize that operations in addition to those shown in FIG. 11 may be performed by system 300. For example, there may be a number of relatively rare "special" situations that may be specifically handled. For example, if there is no text on a page but a hand is present, the page may generally not need to be re-scanned. However, even if there is no text, but the hand covers a large portion of the page, the document may be indicated as needing to be re-scanned.

CONCLUSION

Techniques for automatically locating the presence of a body part, such as a hand, in a scanned image were described herein. Once the body part is located, a determination can be made as to whether the body part covers a part of the image important enough to warrant that the image be re-scanned.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the invention is not limiting of the invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results.

No element, act, or instruction used in the present application should be construed as critical or essential to the invention unless explicitly described as such. Also, as used herein, the article "a" is intended to potentially allow for one or more items. Further, the phrase "based on" is intended to mean "based, at least in part, on" unless explicitly stated otherwise.

What is claimed:

1. A method performed by a computer device, comprising:
   receiving an image of a scanned page of a document;
   constructing a histogram based on value attributes of the image of the scanned page;
   identifying a threshold point for the image of the scanned page based on a local minimum present in the histogram;
   mapping the identified threshold point onto the image of the scanned page to identify a critical area and a non-critical area of the image of the scanned page;
   determining whether the critical area includes an operator-induced artifact; and
   issuing a signal to re-scan the scanned page based on determining that the critical area includes the operator-induced artifact.

2. The method of claim 1, where constructing the histogram based on value attributes of the image of the scanned page includes constructing the histogram based on value attributes of a hue, saturation, and value (HSV) model, where the value attributes include attributes of color, percentage of white, and brightness or intensity.

3. The method of claim 1, where constructing the histogram based on value attributes of the image of the scanned page includes constructing the histogram based on value attributes of a hue, lightness, and saturation (HLS) model.

4. The method of claim 1, where the critical area includes a text portion of the image of the scanned page, and the non-critical area includes a white space portion or a background portion of the image of the scanned page.

5. The method of claim 1, further comprising:
   determining that the non-critical area includes the operator-induced artifact and the critical area does not include the operator-induced artifact; and
   processing the image of the scanned page when the non-critical area includes the operator-induced artifact and the critical area does not include the operator-induced artifact.

6. The method of claim 5, where processing the image of the scanned page includes performing an operation to remove the operator-induced artifact from the non-critical area without rescanning the scanned page.

7. The method of claim 6, where performing the operation to remove the operator-induced artifact from the non-critical area includes extending an area surrounding the operator-induced artifact to cover an area occupied by the operator-induced artifact.

8. The method of claim 1, further comprising:
   identifying the operator-induced artifact within the image of the scanned page based on locating a portion, of the image of the scanned page, with hue and saturation values that correspond to human skin.

9. The method of claim 1, where issuing the signal includes notifying the operator, visually or audibly, that the scanned page needs to be rescanned.

10. A scanning system, comprising:
    a memory to store instructions; and
    a processor to execute the instructions to:
       receive an image of a scanned page of a document,
       construct a histogram based on value attributes of the image of the scanned page,
       identify a threshold point for the image of the scanned page based on a local minimum present in the histogram,
       map the identified threshold point onto the image of the scanned page to identify a text portion and a non-text portion of the scanned page,
       identify an operator-induced artifact on the image of the scanned page,
       determine whether the operator-induced artifact is present in the text portion or the non-text portion,
       process the image of the scanned page, without rescanning the scanned page, when the operator-induced artifact is present in the non-text portion and not in the text portion, and
       generate a signal to rescan the scanned page when the operator-induced artifact is present in the text portion.

11. The scanning system of claim 10, where, when constructing the histogram based on value attributes of the image of the scanned page, the processor is to construct the histogram based on value attributes of a hue, saturation, and value (HSV) model, where the value attributes include attributes of color, percentage of white, and brightness or intensity.

12. The scanning system of claim 10, where, when constructing the histogram based on value attributes of the image of the scanned page, the processor is to construct the histogram based on value attributes of a hue, lightness, and saturation (HLS) model.

13. The scanning system of claim 10, where the non-text portion includes a white space portion or a background portion of the image of the scanned page.

14. The scanning system of claim 10, where, when processing the image of the scanned page, the processor is to perform an operation to remove the operator-induced artifact from the non-text portion without rescanning the scanned page.

15. The scanning system of claim 14, where, when performing the operation to remove the operator-induced artifact from the non-text portion, the processor is to extend an area surrounding the operator-induced artifact to cover an area occupied by the operator-induced artifact.

16. The scanning system of claim 10, where, when identifying the operator-induced artifact, the processor is to identify the operator-induced artifact within the image of the scanned page based on locating a portion, of the image of the scanned page, with hue and saturation values that correspond to human skin.

17. The scanning system of claim 10, where the signal is a visual alarm or an audible alarm.

18. A scanning system, comprising:
    a memory to store instructions; and
    a processor to execute the instructions to:
       receive an image of a scanned page of a document,
       construct a histogram based on value attributes of the image of the scanned page,
       identify, from the histogram, a threshold point for the image of the scanned page, the threshold point corresponding to a transition between a text portion and a non-text portion of the scanned page, identify an operator-induced artifact on the image of the scanned page,
determine that the operator-induced artifact is present in the non-text portion, and
process the image of the scanned page to remove the operator-induced artifact from the non-text portion, without rescanning the scanned page, when the operator-induced artifact is present in the non-text portion.

19. The scanning system of claim 18, where, when determining that the operator-induced artifact is present in the non-text portion, the processor is to determine that the operator-induced artifact is also present in the text portion, and
where the processor is further to generate a signal to rescan the scanned page when the operator-induced artifact is present in the text portion.

20. The scanning system of claim 18, where, when processing the image of the scanned page, the processor is to extend an area surrounding the operator-induced artifact to cover an area occupied by the operator-induced artifact.

21. The scanning system of claim 18, where, when identifying the operator-induced artifact, the processor is to identify the operator-induced artifact within the image of the scanned page based on locating a portion, of the image of the scanned page, with hue and saturation values that correspond to human skin.

* * * * *